United States Patent [19]
Kay

[11] Patent Number: 5,316,167
[45] Date of Patent: May 31, 1994

[54] PRESSURE RESISTANT FUEL TANK CLOSURE

[75] Inventor: Bruce F. Kay, Milford, Conn.

[73] Assignee: United Technologies Corporation, Hartford, Conn.

[21] Appl. No.: 995,874

[22] Filed: Dec. 23, 1992

[51] Int. Cl.5 .............................................. B65D 45/02
[52] U.S. Cl. .................................. 220/328; 220/89.2; 220/208; 411/9
[58] Field of Search ............... 220/328, 327, 89.2, 220/208, 89.1, 204; 411/9, 10, 11, 34, 35, 36, 544

[56] References Cited

U.S. PATENT DOCUMENTS

| | | | |
|---|---|---|---|
| 2,584,100 | 1/1952 | Uecker | 220/328 |
| 4,059,199 | 11/1977 | Quaney | 220/327 X |
| 4,172,573 | 10/1979 | Moore et al. | 220/89.2 X |
| 4,589,564 | 5/1986 | Olster et al. | 220/327 X |
| 5,072,851 | 12/1991 | Wilkes | 220/208 X |
| 5,092,483 | 3/1992 | McKelvy | 220/89.2 X |
| 5,191,991 | 3/1993 | Jackson | 220/328 X |

Primary Examiner—Allan N. Shoap
Assistant Examiner—Christopher McDonald
Attorney, Agent, or Firm—McAulay Fisher Nissen Goldberg & Kiel

[57] ABSTRACT

A container for a fuel tank having an access opening is provided with a closure which fits within a channel in the container to cover the access opening. An elongated bolt has a collapsible cylinder located between the bolt head and the top of the closure to hold the closure to the container. The cylinder is located about the shank of the bolt, and is collapsible above a selected threshold pressure. Under normal bolting conditions, the cylinder is rigid to provide sufficient force to maintain the closure against the tank. Should an abnormal pressure develop within the tank, the closure moves axially along the shank of the elongated bolt, crushing the cylinder and providing additional tank volume to absorb the increased fluid pressure. This reduces the likelihood of catastrophic failure of the closure and also reduces pressure stress on the other tank structures.

13 Claims, 3 Drawing Sheets

PRESSURE RESISTANT FUEL TANK CLOSURE

TECHNICAL FIELD

This invention relates to fuel tanks for aircraft and more particularly to closures for fuel tanks which incorporate means for accommodating instantaneous internal high pressures without closure failure.

BACKGROUND

Aircraft fuel tanks are typically composed of a structural container which surrounds an elastomer bladder. Such tanks typically include various access openings which are covered with bolted closures. In the design of such fuel tanks, one potential hazard is the potential for catastrophic failure due to foreign object impact damage and penetration of the fuel tank. It has been discovered that even using ballistic tolerant materials to produce the structural component of the fuel tank, it is possible that an object penetrating the tank wall at high velocity will generate a hydraulic pressure wave in the contained fluid. As the high speed object penetrates the tank and enters the fluid, it is slowed down due to drag forces. As it slows, the object transfers its kinetic energy to the surrounding fluid which generates an intense pressure wave. When this wave reaches the rigidly bolted closure, it is capable of producing catastrophic failure, stripping the bolts or fracturing the closure or surrounding structure. While additional strengthening bolts or other structures may be added to limit this type of failure, such structures add a severe weight penalty to the aircraft. Consequently, other means for avoiding instantaneous high pressure damage to closures on fuel tanks should be sought.

SUMMARY OF THE INVENTION

It is an object of the present invention to provide means for accommodating instantaneous internal high pressures which act on fuel tank closures without causing failure of the closure.

It is a further object to provide a fuel tank with means for retaining the closures on a tank subject to instantaneous internal high pressures, without adding a severe weight penalty in the tank construction.

These and other objects of the present invention are achieved by providing a fuel tank comprising a container for the fuel, having an access opening defined as a channel having a sidewall, a closure fitted within the channel to cover the access opening. In one embodiment the closure has a resilient seal about its outer periphery. The seal is engaged with the channel sidewall. Means are provided to retain the closure over the access opening which additionally are operative with collapsing means, having a selected collapsing threshold sufficiently high to allow the collapsing means to remain stiff under normal pressure conditions, but sufficiently low to allow collapse when the closure is subject to an instantaneous high pressure. A high pressure acting on the closure forces collapse of the collapsing means, allowing axial displacement of the closure within the channel to provide additional tank volume. During displacement, the resilient seal remains in engagement with the sidewall to prevent leakage. Thus, the displacement absorbs the fluid pressure shock. While the tank may be subjected to leakage due to puncture by the foreign object, the amount of spillage associated with puncture damage is not as drastic as would be the case if a closure were dislodged from the tank. Additionally, displacement of the closure reduces the pressure shock on the tank walls to minimize other structural damage, enhancing survivability of the fuel tank.

BRIEF DESCRIPTIONS OF THE DRAWINGS

DETAILED DESCRIPTION OF THE INVENTION

Figure 1:
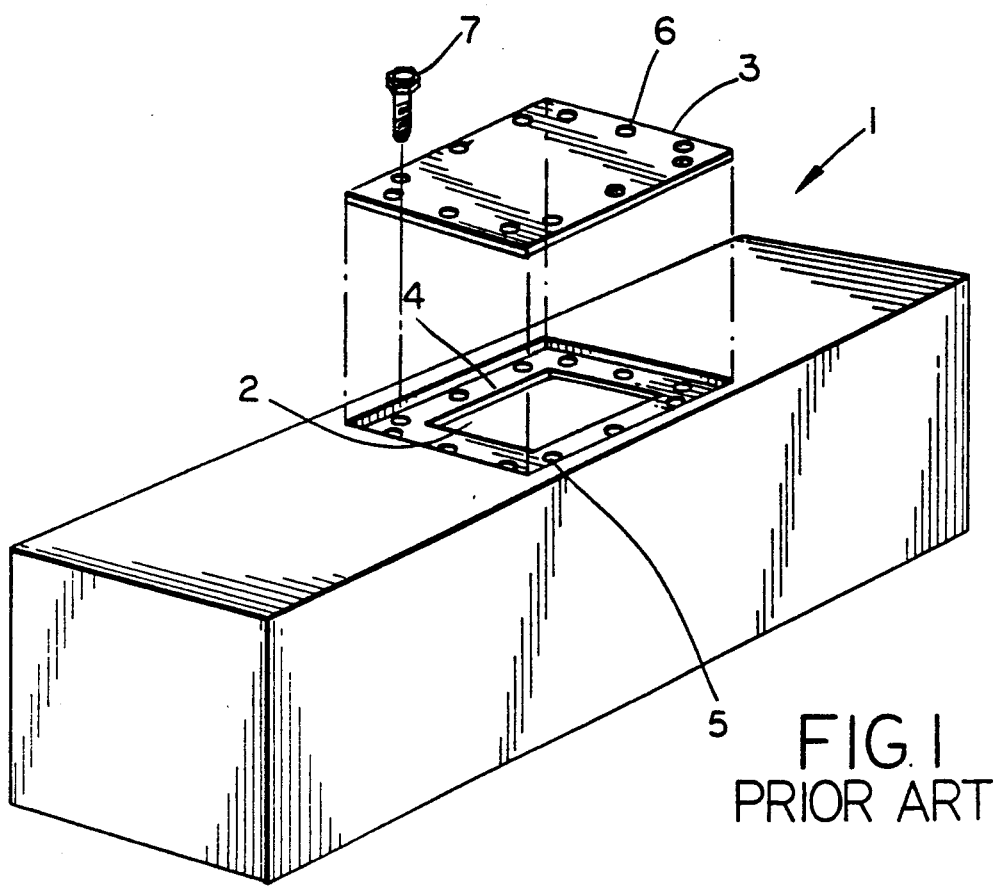
FIG. 1 is a perspective view of a prior art fuel tank including an access opening and closure.

Referring to FIG. 1, a fuel tank 1 has an access opening 2, and a closure 3. The tank 1 has a lip portion 4 with bolt receiving passages 5 which are alignable with holes 6 located about the periphery of the closure. A plurality of bolts 7 extend through the holes 6 into the bolt receiving passages 5. Optionally, gasket means or other seal enhancing materials may be incorporated between the closure and the tank. Such a fuel tank typically includes an internal elastomer bladder. However, for ease of illustration, this is not shown in FIGS. 1 through 5.

Figure 2:
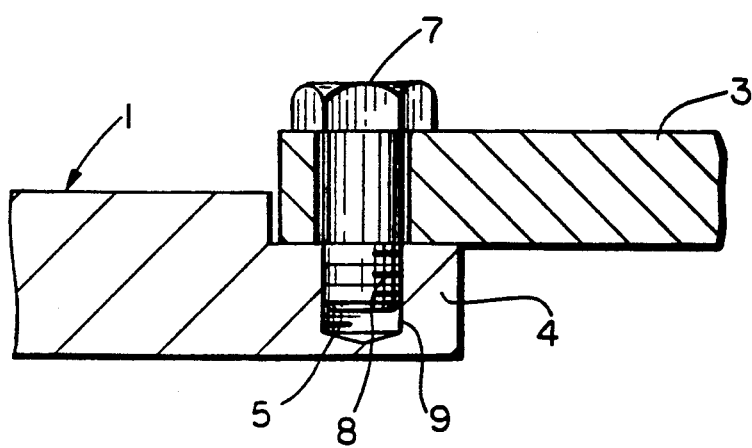
FIG. 2 is a cross-sectional view showing the mating of the prior art closure to a fuel tank.

Referring to FIG. 2, the prior art closure 3 is shown installed on the tank 1 on the lip portion 4. The bolt 7 has a threaded end 8 engaged with a complimentary threaded wall 9 in the bolt receiving passage 5.

Figure 3:
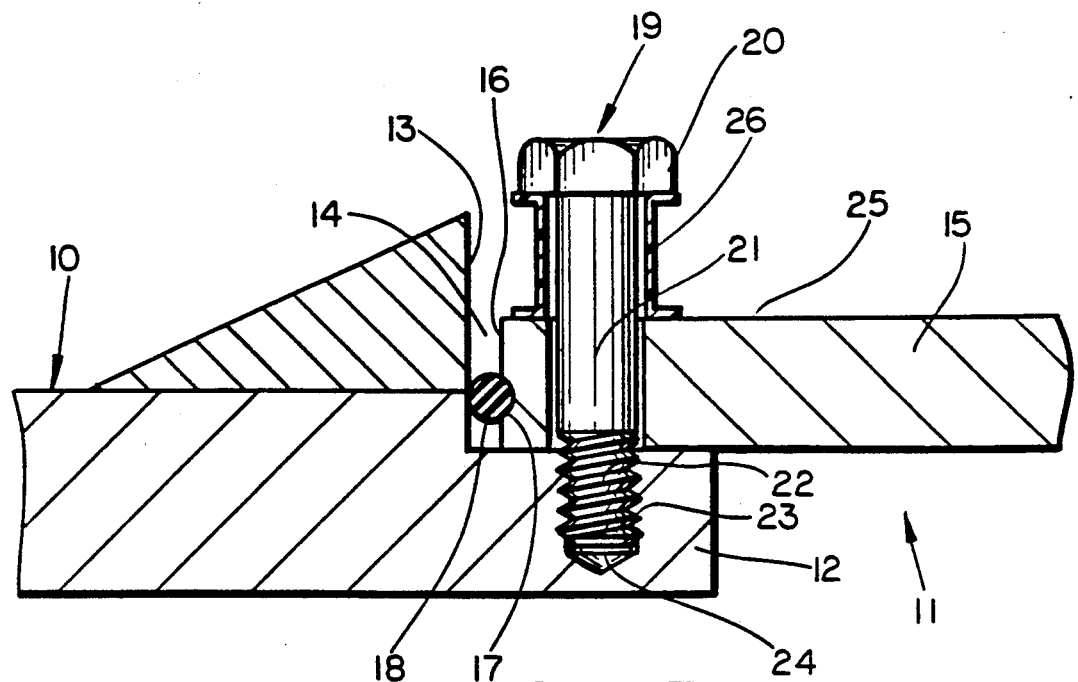
FIG. 3 is a partial cross-sectional view showing one embodiment of the pressure resistant closure of the invention.

Referring to FIG. 3, one embodiment of the pressure resistant closure of the present invention is shown. A tank 10 has an access opening 11 defined by a lip portion 12. The opening may be round, square, rectangular or of another shape. A side wall 13 is located adjacent to and surrounds the lip portion to form a channel 14 which accepts a closure 15 therein. The closure has an end surface 16 and a groove 17 which extends about the periphery of the closure. A resilient seal 18 resides within the groove 17 and thus also extends about the periphery of the closure. The seal may be made of fluoroelastomer, silicone, neoprene or other such materials. The seal is slidably engaged with the channel sidewall 13 within which the closure is located. One of a plurality of bolts 19 has a head 20 and a shank 21 which extends up to about the length of the sidewall. The bolt has a threaded end 22 which engages a threaded wall 23 in a bolt receiving passage 24 in the fuel tank. The space between the bolt head 20 and a top surface 25 of the closure is occupied by a collapsible cylinder 26 which surrounds a portion of the shank 21.

The cylinder 26 is selected in terms of material and physical construction to provide sufficient structural strength to allow bolt tightening such that the closure is rigidly retained on the tank lip during normal operations with sufficient torque to maintain the closure in a sealed condition. Thus, the cylinder is rigid when installed, and does not collapse from normal bolting pressures. However, the cylinder is designed, by choice of material and/or by determination of a proper material thickness and/or by having weakening structures, to collapse when a threshold pressure is exceeded. Thus, normal pressures do not deform the cylinders. For most applications, three times the expected static pressure should provide a sufficient margin of safety. If a 12 psi static pressure is expected, a cylinder designed to crush at 36 psi internal pressure could be provided. Of course, the multiplier for the margin of safety is left as a matter of design choice. As a rule of thumb, a pressure twice or more than the normal operating pressure is considered abnormal. When considering an aircraft application, normal fuel slosh during aircraft maneuvering must be factored into the maximum normal operation pressure.

The collapsing means may fail by deformation or breakage. Consequently, crushable metal cylinders made of a metal such as aluminum, stainless steel, or brass may be used, among others. For example, cylinders composed of aluminum having a wall thickness of about 0.025 inches provides sufficient strength to assure that if a pressure above about 50 lbs per square inches is encountered in the tank, that the closure crushes the cylinders and traverses outwardly from the tank along the bolt shanks.

Also, plastics, particularly fiber reinforced thermosetting or thermoplastic materials or foamed plastic materials may be used as these are easily designed and fabricated for use as collapsing means with the designated thresholds. The fiber reinforcement would give the plastic rigidity under normal conditions and assist in controlled deformation during failure when the threshold is exceeded. Glass, polyaramid or graphite fiber reinforced plastic may be used. The plastic may be epoxy, phenolic, polyurethane, polyester, vinyl ester, polyamide or polyimide, among others. Among thermoplastics, polyetheretherketone, polyetherimide, polyvinyl chloride, polyaryl sulfone among others may be used. Foamed plastic such as foamed polyurethane, polyisooyanate or others may be used.

Figure 4:
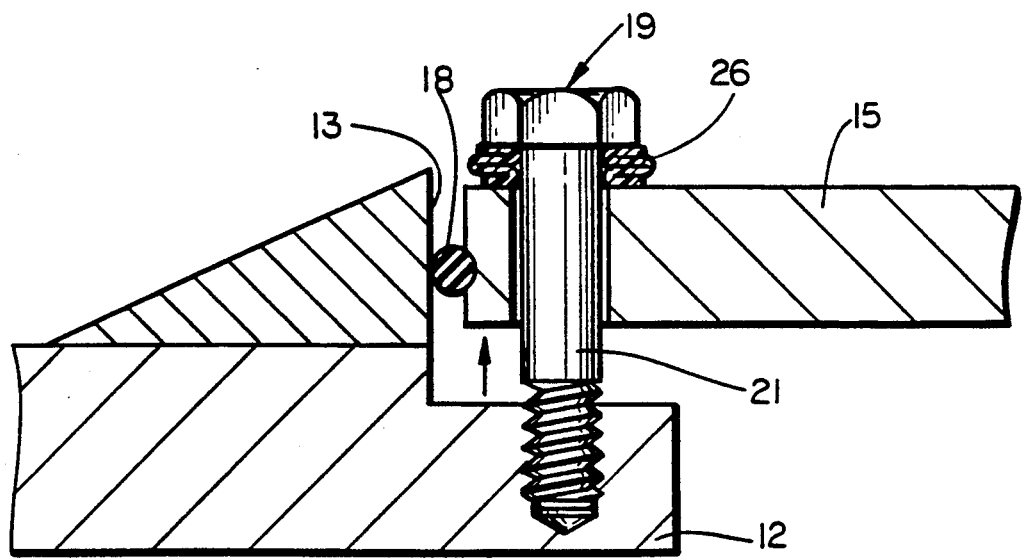
FIG. 4 is a partial cross-sectional view of the closure of FIG. 3, shown subsequent to encountering a high internal pressure within the tank.

Referring to FIG. 4, an illustrative view is provided which shows the effects of an instantaneous high pressure on the closure. The closure 15 has been displaced axially along the bolt shank 21 and the cylinder 26 has been crushed, the crushable cylinder absorbing the force to prevent catastrophic failure of 10 the closure. The peripheral seal 18 is still in engagement with the sidewall 13 and thus fluid leakage is prevented. The closure displacement provides additional tank volume which dampens the pressure wave, minimizing the pressure effect on other tank structures. This limits the potential for tank wall damage.

Figure 5:
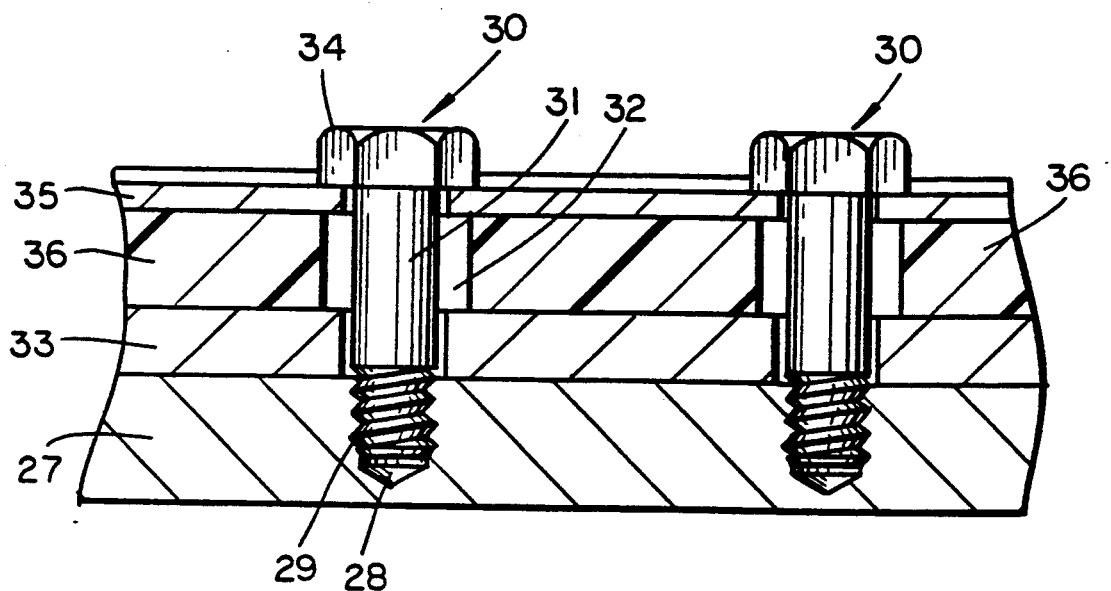
FIG. 5 is a partial cross-sectional view showing an alternative embodiment of the invention.

Referring to FIG. 5, an alternative embodiment of the invention is shown. A tank lip portion 27 has threaded passages 28 which accept threaded ends 29 of bolts 30. The bolts have extended shanks 31 which extend for about the length of a side wall 32. A tank closure 33 rests on the lip portion 22. Beneath bolt heads 34, a thin flange 35 is positioned, which is supported by collapsible foam blocks 36. These foam blocks reside between the bolts and transmit the retaining force from the bolts 30 to the closure 33. Thus, they are of sufficient strength to maintain the closure in position under normal operating conditions. When a high internal pressure is encountered, the foam is crushed as the closure moves axially along the bolt shank, similar to the cylinder embodiment previously described. However, positioned between bolts, the surface area coverage is increased which spreads the force over the flange 35 to dampen the collapsing effect and further minimize shock effects on the retaining bolts.

Figure 6:
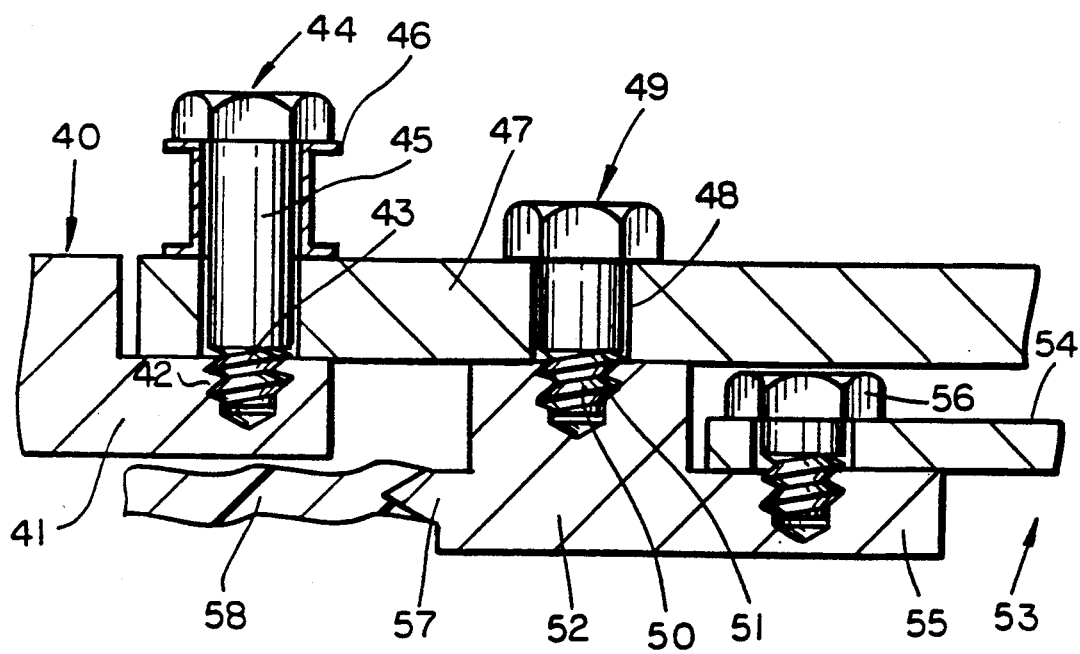
FIG. 6 is a partial cross-sectional view of another alternative embodiment of the invention.

Referring to FIG. 6, another alternative embodiment of the invention is shown. A tank 40 has a lip portion 41 with a threaded passage 42 for accepting a threaded end 43 of a bolt 44 having an extended shank 45. The shank 45 is surrounded by a collapsible cylinder 46, similar to the cylinder of FIG. 3. However, no channel sidewall is included. Rather the cylinder 46 rests on an outer cover 47 which has passages 48 through which bolts 49 pass. Threaded ends 50 of the bolts 49 are engaged in threaded passages 51 in an elastomer bladder closure flange 52. The closure flange surrounds an opening 53 over which a main closure 54 is located. The closure flange 52 has a lip portion 55 on which the closure 54 rests. As in the other embodiments, a gasket or other seal enhancing means may be used to prevent leakage between the closure and lip portion. The closure is retained by bolts 56 which engage the lip portion 55. The closure flange 52 is bonded, riveted or otherwise attached about its periphery 57 to an elastomer bladder 58.

In this embodiment, an internal high pressure acting on the closure and bladder causes displacement of the entire assembly, closure, closure flange and cover, with the bladder to closure seal remaining in effect to prevent leakage. Since the bladder is elastomer, it can accommodate the assembly displacement when the cylinders are crushed, avoiding the need for a peripheral seal and extended sidewall. This simplifies tank construction and allows ease in variation of the extended bolt shank lengths and/or crushing means size/shape.

Utilizing a plurality of crushable structures acting with elongated fasteners, instantaneous internal high pressure forces cause axial displacement of the closure and/or closure assembly along the fasteners thus absorbing impact energy and creating additional tank volume. The increased volume reduces internal pressure while the structures absorb energy to minimize the shock impact on the other fuel tank structures.

While preferred embodiments of the present invention have been shown and described, it will be understood by those skilled in the art that various changes and/or modifications could be made without varying from the scope of the present invention. For example, the type and number of retaining means (bolts), the choice of collapsing means and the means to provide crushability in the collapsing means may be provided in various ways. Consequently, the present invention is not limited to the specific embodiments disclosed.

I claim:

1. A fuel tank comprising a container for fuel having an access opening, defined by a lip portion of the container, a channel having a continuous sidewall surrounding the lip portion, a closure fitted within the channel to cover the access opening and having a seal about the periphery thereof, the seal engaged with the sidewall, means to retain the closure over the access opening and collapsing means associated with the retaining means, the collapsing means having a collapsing threshold sufficiently high such that the collapsing means remain rigid under normal pressure conditions, but sufficiently low such that the collapsing means collapse when an abnormal pressure acts on the closure, the closure being axially displaced as the collapsing collapse, the seal means remaining in engagement with the sidewall of the channel to prevent substantial leakage when the closure has been axially displaced.

2. The tank of claim 1 wherein the seal is composed of material selected from the group consisting of flouroelastomer, silicone, neoprene and combinations thereof.

3. The tank of claim 1 wherein the retainer means comprise a plurality of bolts, the container lip portion having means for accepting ends of the bolts therein.

4. The tank of claim 3 wherein the collapsing means are disposed between a top surface of the closure and a head of each bolt.

5. The tank of claim 3 wherein the collapsing means comprise a plurality of cylinders which surround each bolt.

6. The tank of claim 5 wherein each cylinder is composed of metal.

7. The tank of claim 6 wherein the cylinder is composed of a metal selected from the group consisting of aluminum, stainless steel, brass or steel.

8. The tank of claim 5 wherein each cylinder is composed of plastic.

9. The tank of claim 8 wherein each cylinder is composed of a plastic selected from the group consisting of fiber reinforced thermosetting plastic and fiber reinforced thermoplastic plastic.

10. The tank of claim 1 wherein the abnormal pressure is a pressure greater than about two times the normal operating pressure.

11. The tank of claim 1 wherein the retainer means comprise a plurality of bolts, having elongated shanks having a length sufficient to accept closure displacement of from about 0.5–1" when the collapsing means are crushed.

12. The tank of claim 3 further comprising a flange disposed beneath the bolts, the collapsing means disposed between the flange and the closure and between adjacent bolts.

13. A method for providing a fuel tank having a pressure resistant closure comprising:
   providing a container having an access opening defined by a lip portion of the container, a channel having a continuous sidewall surrounding the lip portion;
   providing a closure sized to cover the access opening and to rest on the lip portion, the closure having seal means disposed about the periphery thereof;
   placing the closure within the channel such that the seal means are in engagement with the sidewall;
   providing retainer means for fixing the closure over the access opening;
   providing collapsing means in association with the retainer means and disposed adjacent a top surface of the closure, the collapsing means having a collapsing threshold sufficiently high such that when an abnormal pressure acts on the closure, the collapsing means collapse such that the closure is axially displaced within the channel and,
   engaging the retainer means with the container so as to hold the closure against the container to seal the access opening.

* * * * *